US012630022B2

(12) United States Patent
Sobierajski et al.

(10) Patent No.: US 12,630,022 B2
(45) Date of Patent: May 19, 2026

(54) VEHICLE CONTROL SYSTEM

(71) Applicant: Transportation IP Holdings, LLC, Norwalk, CT (US)

(72) Inventors: Jennifer Sobierajski, Erie, PA (US); Ajith Kuttannair Kumar, Ashburn, VA (US); Haris Memic, Erie, PA (US); Henry Todd Young, Erie, PA (US); Ibrahim Kacar, Erie, PA (US); James Ghofulpo, Erie, PA (US); Jeffrey John Wolff, Erie, PA (US); Timothy Warren Brown, Erie, PA (US); Daniel Robert Wallace, Fulton, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 170 days.

(21) Appl. No.: 18/450,324

(22) Filed: Aug. 15, 2023

(65) Prior Publication Data

US 2024/0092179 A1 Mar. 21, 2024

Related U.S. Application Data

(60) Provisional application No. 63/408,684, filed on Sep. 21, 2022.

(51) Int. Cl.
*B60L 5/00* (2006.01)
*B60L 3/00* (2019.01)
*B60L 50/53* (2019.01)

(52) U.S. Cl.
CPC .............. *B60L 5/00* (2013.01); *B60L 3/0061* (2013.01); *B60L 50/53* (2019.02); *B60L 2240/14* (2013.01); *B60L 2240/421* (2013.01)

(58) Field of Classification Search
CPC .......... B60L 5/00; B60L 3/0061; B60L 50/53; B60L 2240/14; B60L 2240/421; B60L 5/04; B60L 5/38; B60L 3/00
See application file for complete search history.

(56) References Cited

U.S. PATENT DOCUMENTS

2011/0231034 A1* 9/2011 Kinser ..................... B60K 6/46
701/2
2012/0316717 A1 12/2012 Daum et al.
(Continued)

FOREIGN PATENT DOCUMENTS

CN 112622646 A 4/2021
EP 4056406 A1 9/2022

OTHER PUBLICATIONS

European Search Report mailed Feb. 16, 2024 for corresponding Application No. 23195301.9 (11 pages).

*Primary Examiner* — Rodney A Butler
(74) *Attorney, Agent, or Firm* — K&L Gates LLP

(57) ABSTRACT

A method including detecting that a vehicle that may be propelled by an electric drive system having one or more motors disconnects or begins disconnecting from an off-board source of power while the one or more motors are being powered by the off-board source of power. The method may include supplanting a decreasing amount of a first electric energy supplied by the off-board source of power to the electric drive system with an amount of a second electric energy supplied by an onboard source of power to the electric drive system responsive to the detection of the disconnect from the off-board source of power.

18 Claims, 8 Drawing Sheets

(56) References Cited

U.S. PATENT DOCUMENTS

2015/0303768 A1 * 10/2015 Henderson ............. B60L 13/04
                                                  310/90.5
2022/0204061 A1    6/2022 Woo et al.

* cited by examiner

VEHICLE CONTROL SYSTEM

CROSS-REFERENCE TO RELATED APPLICATIONS

This application claims priority to U.S. Provisional Application No. 63/408,684, filed on Sep. 21, 2022, the entire disclosure of which is incorporated herein by reference.

BACKGROUND

Technical Field

The subject matter described herein relates to controlling operation of vehicles having collector devices that can obtain electric current for powering the vehicles from off-board power sources.

Discussion of Art

Some vehicles may be powered by electric current obtained from an off-board power source. For example, some mining vehicles, rail vehicles, buses, or the like, may be powered by coupling a collector device, such as a pantograph or a conductive shoe with a conductive pathway, such as an overhead catenary or an electrified rail.

The collector device may collect power through contact with the conductive pathway. The conductive pathway may extend along a route being traveled by the vehicle. The conductive pathway may power loads to the vehicle. The collector device may be spring-loaded to push a contact shoe up or down against the conductive pathway to draw the current needed to run the vehicle. Return current may run through the route being traveled. As the vehicle moves, the collector device may slide along the conductive pathway and may set up standing waves in the wires which break the contact and degrade current collection.

These vehicles may be dependent upon a continual connection with the conductive pathway, such as the catenary or electrified rail. For example, separation of the pantograph or conductive shoe from the catenary or rail may prevent conduction of electric current from the catenary or electrified rail to the pantograph or conductive shoe. This can cause power to not be delivered to motors or other loads of the vehicle, thereby resulting in undesirable and sudden deceleration of the vehicle. Additionally, upon re-connection of the pantograph or conductive shoe with the catenary or electrified rail, a rush of current may cause an undesirable acceleration of the vehicle. Other issues may be that the pantograph or conductive shoe may separate from the catenary or electrified rail. This may be possibly due to one or more of bouncing of the pantograph, the conductive shoe, or the vehicle; a drooping or other bent sections of the catenary or electrified rail; damaged or deteriorated route surfaces; motors or other components being unable to fully extend the pantograph or lower the conductive shoe; or the vehicle moving away or off course from the route that has the catenary or the electrified rail. It may be desirable to have a system and method that differs from those that are currently available.

BRIEF DESCRIPTION

In accordance with one example or aspect, a method is described that may include detecting that a vehicle that is propelled by an electric drive system having one or more motors disconnects or begins disconnecting from an offboard source of power while the motors are being powered by the off-board source of power. The method may include supplanting a decreasing amount of a first electric energy supplied by the off-board source of power to the electric drive system with an amount of a second electric energy supplied by an onboard source of power to the electric drive system responsive to detecting that the vehicle disconnects from the off-board source of power.

In accordance with another example or aspect, a system is described that may include one or more processors that may be coupled with a vehicle that is propelled by an electric drive system having one or more motors. The vehicle may be powered by one or more of a first electric energy from an off-board power source or a second electric energy from an onboard power source. The one or more processors may detect whether the vehicle disconnects or begins disconnecting from the off-board power source while the vehicle is being powered by the first electric energy of the off-board power source. The one or more processors may supplant the first electric energy of the off-board power source to the vehicle with an amount of the second electric energy of the onboard power source responsive to detecting the vehicle disconnects or begins disconnecting from the off-board power source.

In accordance with another example or aspect, a system is described that may include a collector device coupled to a vehicle that is propelled by an electric drive system having one or more motors. A conductive pathway may extend along a route being travelled by the vehicle. The conductive pathway may selectively engage the collector device to provide a first electric energy to the electric drive system. A controller may detect a disconnection of the vehicle from the conductive pathway while the electric drive system is being powered by the first electric energy. The controller may supplant a decreasing amount of the first electric energy from the collector device with an amount of a second electric energy supplied by an onboard power source to power the electric drive system responsive to the detection of the disconnection from the conductive pathway.

BRIEF DESCRIPTION OF THE DRAWINGS

The subject matter may be understood from reading the following description of non-limiting embodiments, with reference to the attached drawings, wherein below.

DETAILED DESCRIPTION

Embodiments of the subject matter described herein relate to vehicle control systems and methods that control operation of a vehicle having a collector device that receives and conducts electric current from a conductive pathway to power loads of the vehicle. The conductive pathway may be an off-board source of power for the vehicle. In one example, the collector device may be a pantograph of the vehicle that raises to contact an overhead catenary. As another example, the collector device may be a conductive shoe of the vehicle that lowers to contact an electrified rail. These collector devices can conduct electric current from the conductive pathway to motors of the vehicle to propel the vehicle along one or more routes. The vehicle may also have an onboard power source capable of providing current to motors to propel the vehicle along one or more routes. One or more embodiments of the subject matter described herein relate to systems and methods that control operation of the vehicle to prevent separation of the collector device from the conductive pathway from negatively impacting operation and movement of the vehicle.

The vehicles and vehicle systems described herein extend to multiple types of vehicles or vehicle systems. Suitable vehicle types may include automobiles, trolleys, electric trains, electric buses, trucks (with or without trailers), rail vehicles or rail vehicle systems, marine vessels, aircraft (such as electric aircraft during charging), mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together as a group. Vehicle systems may also be referred to as vehicle groups, convoys, consists, swarms, fleets, platoons, trains, etc.

Figure 1:
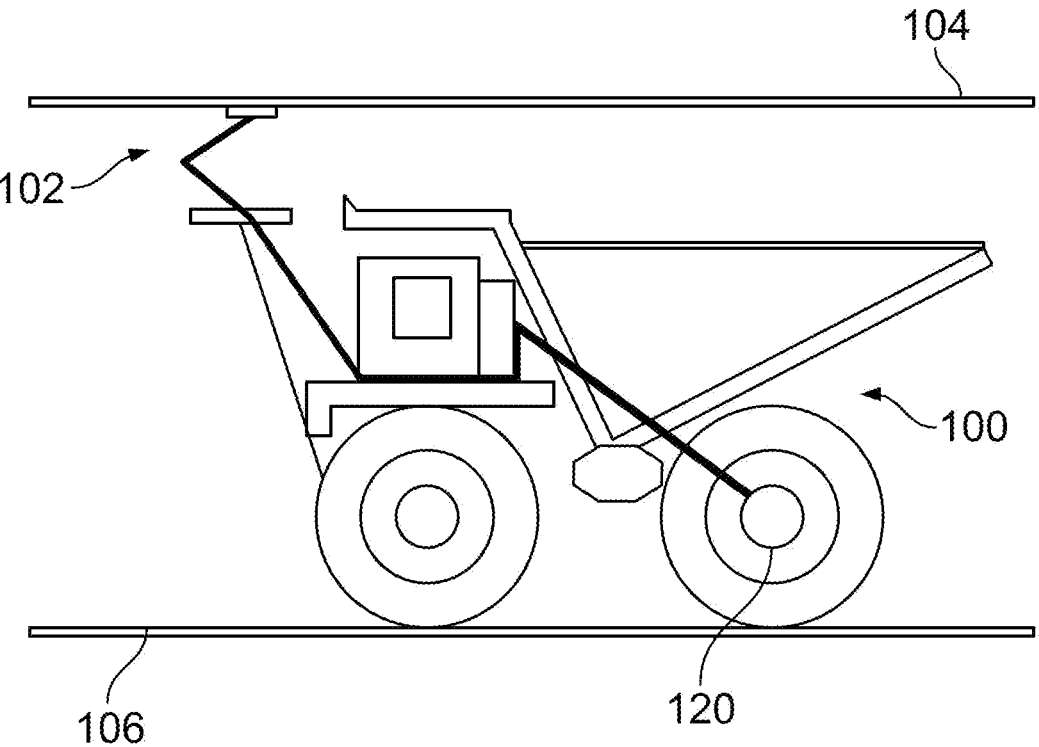
FIG. 1 is a side view of a vehicle, a collector device, and a conductive pathway, according to one example.

FIG. 1 illustrates one example of a side view of a vehicle 100, a collector device 102, and a conductive pathway 104. The vehicle may include the collector device, and the collector device may engage the conductive pathway. The collector device may selectively engage the conductive pathway during operation of the vehicle. The vehicle may travel along a route 106 such as a road, track, path, or the like. The conductive pathway may extend along the route or a portion of the route. The conductive pathway may extend above the route, on the route, or alongside the route and may power loads of the vehicle. The conductive pathway may be an off-board source of power for the vehicle. The loads of the vehicle may include power for motors, lights, control systems, displays, air conditioning, and the like. In one example, the vehicle may be a mining vehicle, a trolley, an electric train, an electric bus, or an electric automobile. The vehicle may have wheels 120 positioned to engage the route being traveled by the vehicle.

In one example, the conductive pathway may be an overhead catenary line, as shown in FIG. 1. The conductive pathway may be an overhead trolley line, a traction wire, an overhead contract system, overhead equipment, an overhead line, or the like. In these embodiments, the collector device may be a pantograph that raises above the vehicle to contact or engage the conductive pathway, as discussed further below. The conductive pathway may be positioned over the route and may be connected to feeder stations at regular intervals which may provide electric power (i.e., voltage and/or current) to the conductive pathway. The feeder stations may be electrically connected to a high-voltage electrical grid to provide electrical current and energy to the conductive pathway. The catenary line may engage an upper portion of the vehicle to provide the electric current to the vehicle.

In another example, the conductive pathway may be an electrified rail or rails over which the vehicle travels. The electrified rail may be a third rail that runs adjacent to or near a first rail and a second rail that make up the route. The electrified rail may engage a lower portion of the vehicle, for example a conductive shoe, to provide the electric current to the vehicle. In this example, the conductive shoe may be the collector device. The conductive shoe may lower or move laterally to contact or engage the third rail. The wheels may engage the first and second rail, while the conductive shoe may engage the third rail.

The collector device may be positioned at the upper portion of the vehicle, such as a pantograph coupled to the upper portion of the vehicle. In other examples, the collector device positioned at the upper portion of the vehicle may include a bow collector, a trolley pole, or the like. The pantograph may raise to a position extended away from the upper portion of the vehicle and may lower to a position where the pantograph may generally be adjacent the upper portion of the vehicle. When lowered, the pantograph may be in a storage or travel position, such that a height above the vehicle may be reduced. The pantograph may raise to engage the overhead catenary line to receive the electric current and provide the current to the vehicle. The pantograph may be electrically conductive with the catenary line, but the pantograph may include an insulated portion in contact with the upper portion of the vehicle.

The collector device may be positioned at the lower portion of the vehicle, such as a conductive shoe positioned at the lower portion of the vehicle. The conductive shoe may project laterally from the lower portion or may extend vertically downward to engage the electrified rail. The conductive shoe may lower or extend to engage the electrified rail to receive the electric current and provide the current to the vehicle. The first and second rails of the route may be metal, such as steel. Where the first and second rails are steel, the first and second rails may act as an electrical return for excess current supplied to the vehicle. The first and second rails may act as a grounding force, dissipating the excess current or may act to transport the excess current to a facility, such as the feeder station or the electrical grid. In one example, a fourth rail may be used. The fourth rail may serve as the electrical return system, such that excess current is returned to the facility by the fourth rail.

Figures 2, 3:
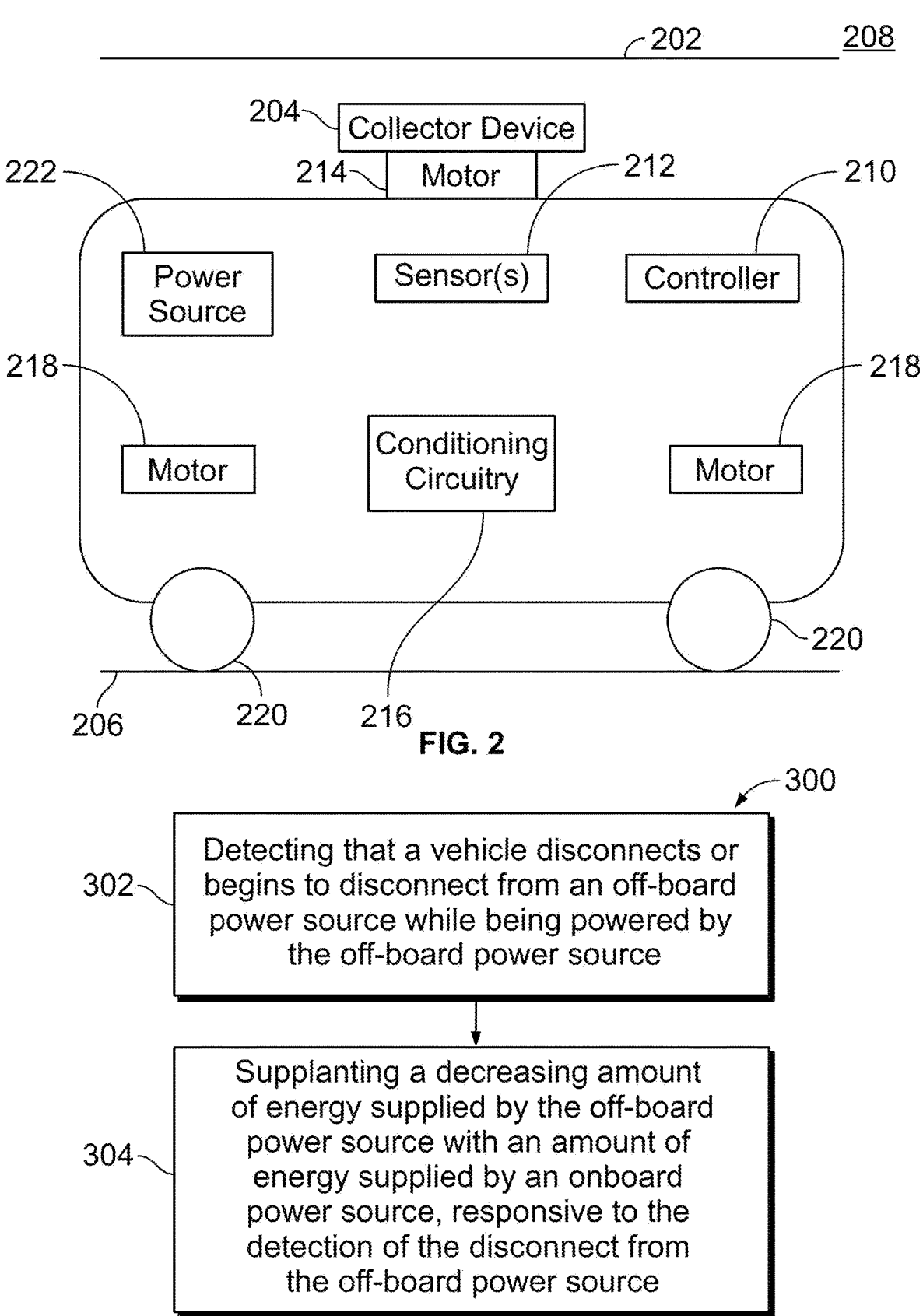
FIG. 2 is a schematic view of a vehicle, a collector device, and a conductive pathway, according to one example.
FIG. 3 is a method of controlling operation of a vehicle during a disconnection from an off-board power source, according to one example.

FIG. 2 illustrates a schematic view of a vehicle, a collector device, and a conductive pathway, according to one example. With continued reference to the vehicle shown in FIG. 1, FIG. 2 illustrates one example of a vehicle control system 208. The vehicle control system may include a controller 210 and one or more sensors 212. The vehicle may include a collector device 204, one or more motors 218, a power source 222, and wheels 220. The control system may include a conductive pathway 202 along the route being travelled by the vehicle. Where the vehicle is travelling near the conductive pathway, the collector device may engage the conductive pathway to provide a first electric energy to power loads of the vehicle. However, the conductive pathway may not extend along the entirety of the route being travelled by the vehicle. Thus, where the vehicle is travelling along a portion of the route without the conductive pathway, the vehicle may receive power from the power source onboard the vehicle to power the loads. The controller may evaluate when and how much power to use from the offboard power source, for example the conductive pathway, and onboard power source. The vehicle may connect to the conductive pathway at certain portions of the route and may disconnect from the conductive pathway at other portions of the route. The controller may receive outputs from the sensors to determine when the vehicle may be connected with the conductive pathway, disconnected from the conductive pathway, beginning disconnection from the conductive pathway, or the like, as further discussed below.

The controller may represent hardware circuitry that may include and/or may be connected with one or more processors that may control operation of the vehicle control system as described herein. The processors may include microprocessors, microcontrollers, integrated circuits, field programmable gate arrays, or other logic devices that operate based on instructions stored on a tangible and non-transitory computer readable storage medium, such as software applications stored on a memory. In one example, the controller described herein may include and/or may be connected with an artificial intelligence (AI) neural network that may perform the operations herein in connection with the controller.

The one or more sensors of the vehicle control system may monitor mechanical or electrical characteristics of the conductive pathway, the collector device, and/or the electric energy that is conducted from the conductive pathway to the vehicle via the collector device. The electrical sensors may include an ohmmeter measuring electrical resistance, a voltmeter measuring electrical potential in volts, an impedance analyzer measuring impedance, an ammeter measuring current, a database or memory, a thermometer measuring a temperature of the energy storage system, an input device (e.g., control panel, switch, keyboard, microphone, etc.), or the like. The electrical sensors may measure the potential or voltage of the conductive pathway, electric current conducted from the conductive pathway to the collector device, the power or wattage of the energy transferred from the conduct this pathway to the collector device, or the like.

The mechanical sensors may include an optical sensor (e.g., an infrared sensor, a camera, a proximity detector, etc.), a strain gauge, a speed sensor, a Hall effect sensor, an acoustic sensor (e.g., an ultrasonic sensor), a capacitive sensor, a photoelectric sensor, an inductive sensor, a laser distance sensor (e.g., Light Detection and Raging ["LIDAR"]), or the like. The mechanical sensors may measure the physical characteristics of the collector assembly, the vehicle, the conductive pathway, or a combination of the three. Additionally, the mechanical sensors may measure components of the collector assembly, the vehicle, or the conductive pathway. The mechanical sensors may measure a position or a maximum height of the collector device, a speed of the vehicle, a position of the vehicle or the collector device relative to the conductive pathway, a strain on the collector device or the conductive pathway, among other measurements.

The controller may use outputs from the sensors to detect when the vehicle may be connected to the conductive pathway and when the vehicle may be disconnected from the conductive pathway. For example, the sensors may detect a voltage or current between the conductive pathway and the vehicle that may indicate a connection or no connection. The controller may monitor the output of the sensors to determine whether the voltage and/or current may be within a predetermined range that may indicate a connection between the vehicle and the conductive pathway. Where the voltage and/or current may be below the predetermined range, that may indicate a disconnection between the vehicle and the conductive pathway. In another example, the sensors may include optical sensors that may read, scan, or otherwise identify an identifying marker on one or both of the conductive pathway and the vehicle to indicate a connection or no connection. The identifying mark can be indicia printed on the vehicle or the conductive pathway. When the optical sensor may scan or read the identifying marker, the optical sensor may output the information to the controller. The controller may then use the output from the optical sensor to determine a connection or no connection.

Additionally, the controller may use outputs from the sensors to estimate or predict when the vehicle may be approaching an upcoming connection point or an upcoming disconnection point from the conductive pathway. Where the sensors detect a voltage and/or a current between the conductive pathway and the vehicle, the controller may monitor the outputs of the sensors to determine a decrease or drop in voltage and/or current. A decrease in the voltage or current may indicate an upcoming disconnection. The controller may detect the upcoming disconnection point when the sensor outputs a decrease in current received by the vehicle from the off-board source of power. The decrease in current may presage a subsequent decrease in voltage received by the vehicle from the off-board source of power. As such, the controller may prepare the vehicle for disconnection responsive to the sensor outputting a decrease in current received by the vehicle. As discussed further below, the preparation for the disconnection may include one or more of increasing the engine speed, reducing a torque output by the one or more motors, moving the collector device, or the like. The controller may prepare the vehicle for disconnection prior to or while the subsequent decrease in the voltage occurs.

In one example, the conductive pathway may have a distinctive curvature or elevation at an end of path to indicate the upcoming end of the conductive pathway. For example, the conductive pathway may ramp upward at the end of path. The sensors may be able to identify the ramp upward at the end of the path and communicate the ramp upward to the controller. The ramp upward may indicate to the controller the upcoming end of path of the conductive pathway, and the controller may then prepare the vehicle for disconnection.

The conductive pathway may include edge of line identifiers. The edge of line identifiers may be a marker (e.g., a QR code or a label) that may be read or identified by a proximity sensor when the proximity sensor is within a predetermined distance from the marker. The proximity sensor may be able to identify the markers and communicate the markers to the controller. The controller may determine the markers as the edge of line identifiers which may indicate a potential disconnection of the vehicle from the conductive pathway. This may allow the controller to prepare the vehicle for the disconnection. The controller may implement AI or machine learning to review the outputs from the sensors when determining the connection or disconnection status of the vehicle and the conductive pathway.

In one example, the sensors may communicate the outputs to the controller via a communication device. However, in one example, the sensors may communicate directly with the controller. The communication device may communicate with one or more other vehicles and/or other remote systems that are off-board the vehicle, such as an off-board controller, a back office control system, an off-board crew member, or the like. The communication device may include or represent an antenna (along with associated transceiver hardware circuitry and/or software applications) for wirelessly communicating with other vehicles and/or remote locations. Optionally, the communication device may communicate via one or more wired connections, such as a multiple unit (MU) cable, a trainline, an electrically controlled pneumatic (ECP) brake line, or the like.

A collector device motor 214 optionally may be provided to move the collector device toward or away from the conductive pathway. For example, the controller can control operation of the collector device motor to raise the collector device upward and away from the vehicle to the overhead conductive pathway so that the collector device may engage the conductive pathway. As another example, the collector device motor may lower the collector device beneath the vehicle or may move the collector device laterally away from the vehicle to engage the collector device with a conductive pathway.

The controller may control operation of the collector device by directing the collector device motor to move the collector device into engagement with the conductive pathway so that a first electric energy may be obtained from the conductive pathway. The first electric energy, such as an electric current, may be conducted from the conductive pathway, through the collector device, to a conditioning circuitry 216 of the vehicle. The conditioning circuitry may include one or more rectifiers, inverters, switches, transformers, resistive elements, or the like. The conditioning circuitry may modify the current obtained from the conductive pathway prior to delivering or conducting the current that has been modified to the motors of the vehicle. The motors and conditioning circuitry can represent an electric drive system of the vehicle that operates to propel the vehicle along the route.

The vehicle control system optionally may include an onboard power source. The onboard power source can generate or create a second electric energy, such as an electric current or a voltage, to power loads of the vehicle, such as the motors. Examples of the onboard power source can include an engine and an alternator or generator, one or more batteries or batteries cells, one or more capacitor banks, one or more fuel cells, or the like.

The conductive pathway may operate as an off-board source of power when the collector device is engaging the conductive pathway. In one example, when the collector device engages the conductive pathway, the conductive pathway may be a primary source of power for the vehicle and the onboard power source may be a secondary source of power for the vehicle. In another example, when the collector device engages the conductive pathway, the conductive pathway may be a secondary source of power for the vehicle and the onboard power source may be a primary source of power for the vehicle. In one example, where the collector device does not engage the conductive pathway, the onboard power source may be the primary source of power of the vehicle. As used herein, a primary source of power may include the power source that provides or contributes the most power to the vehicle at a given time. As used herein, a secondary source of power may include the power source that provides or contributes an amount of power less than the primary source of power to the vehicle at a given time.

In one example, the amount of second electric energy supplied by the onboard power source may be less than a power capacity at which the off-board power source may be able to provide the first electric energy. The amount of second electric energy may thereby reduce an amount of power generated by the motors that are electrically coupled to the electric drive system.

As described herein the controller can control operation of the onboard power source to supplant, augment, or replace the current conducted from the conductive pathway or off-board power source to the motors. In one example, the controller may control an acceleration or a deceleration of the vehicle to within a designated threshold range based at least in part on a combined amount of the first electric energy supplied by the conductive pathway or off-board power source and the second electric energy supplied by the onboard power source.

When the collector device disconnects from the conductive pathway, the amount of off-board energy the vehicle is receiving may decrease. When the off-board energy received by the vehicle decreases, the vehicle may need to adjust or increase the amount of energy supplied by the onboard power source to maintain consistence power and performance. The system may supplant the decreasing amount of electric energy from the conductive pathway with an amount of electric energy supplied by the onboard power source responsive to a disconnection (or determined upcoming disconnection) of the collector device from the conductive pathway.

In operation, the controller may monitor outputs from the sensors to detect whether the collector device has disconnected, has begun disconnection from the off-board source of power (e.g., the conductive pathway), or may be approaching a disconnection from the off-board source of power. The sensors may output optical information from an optical sensor, electrical characteristics from a voltage or current sensor, strain output from a strain gauge, or the like, as discussed above. In one example, the sensor may measure a height of the pantograph to determine whether the height of the pantograph is above a threshold height. In one example, the sensor may measure a height of the conductive shoe to determine whether the height of the conductive shoe is below a threshold depth below the vehicle.

Additionally, the controller may monitor outputs from the sensors to predict an upcoming disconnection event. This may allow the controller to adjust operation of the vehicle accordingly for the upcoming disconnection. The sensors may measure the speed and/or acceleration of the vehicle, a lateral position of the collector device (e.g., whether the collector device is centered or offset from the conductive pathway), the height of the collector device, an edge or end of the conductive pathway, the location of the vehicle, a strain on the collector device or the conductive pathway, or the like. The controller may use one or more of the outputs from the sensor to determine when and where the collector device may connect or disconnect from the conductive pathway. The controller may then use the determination of the connection or disconnection to increase or decrease an amount of energy supplied by the onboard source of power in order to provide a sufficient amount of energy to the vehicle.

FIG. 3 shows one example of a flowchart illustrating a method 300 for controlling operation of a vehicle during a disconnection from an off-board power source. The vehicle may be propelled by an electric drive system having one or more motors. In one example, the off-board power source may be a conductive pathway. A collector device of the vehicle may connect and disconnect from the conductive pathway during travel of the vehicle. The vehicle may disconnect from the conductive pathway due to an end of the conductive pathway, a displacement of a wire of the conductive pathway, a turn of the vehicle, a misalignment of the vehicle, a curvature of the conductive pathway, a grid failure preventing energy transfer from the conductive pathway, or the like.

At step 302, the method may include detecting that the vehicle may be disconnected or may be beginning to disconnect from the off-board power source while the motors are being powered by the off-board power source. In one example, the detection that the vehicle is disconnecting may include detecting a decrease in current or voltage received by the vehicle from the off-board source of power. The decrease in current or voltage may be measured by a sensor, such as an ammeter or a voltmeter. The decrease in current or voltage received by the vehicle from the off-board source may presage a subsequent decrease in voltage received by the vehicle from the off-board source.

At step 304, the method may include supplanting a decreasing amount of a first electric energy supplied by the off-board power source to the electric drive system with an amount of a second electric energy supplied by an onboard power source to the electric drive system. The supplanting of the decreasing first electric energy with the second electric energy may be done in response to the detection of the disconnection from the off-board power source. In one example, the onboard power source may be an engine and an alternator or generator, one or more batteries or batteries cells, one or more capacitor banks, one or more fuel cells, or the like. In one example, the supplanting of the second electric energy may include opening one or more switches between one or more of a pantograph or a conductive shoe of the vehicle and the motors. An electric current conducted from the pantograph or conductive shoe may be monitored subsequent to the opening of the switches. The monitoring may allow a controller to responsively extend a height of the pantograph relative to the conductive pathway or a distance of the conductive shoe relative to the conductive pathway.

Figure 4:
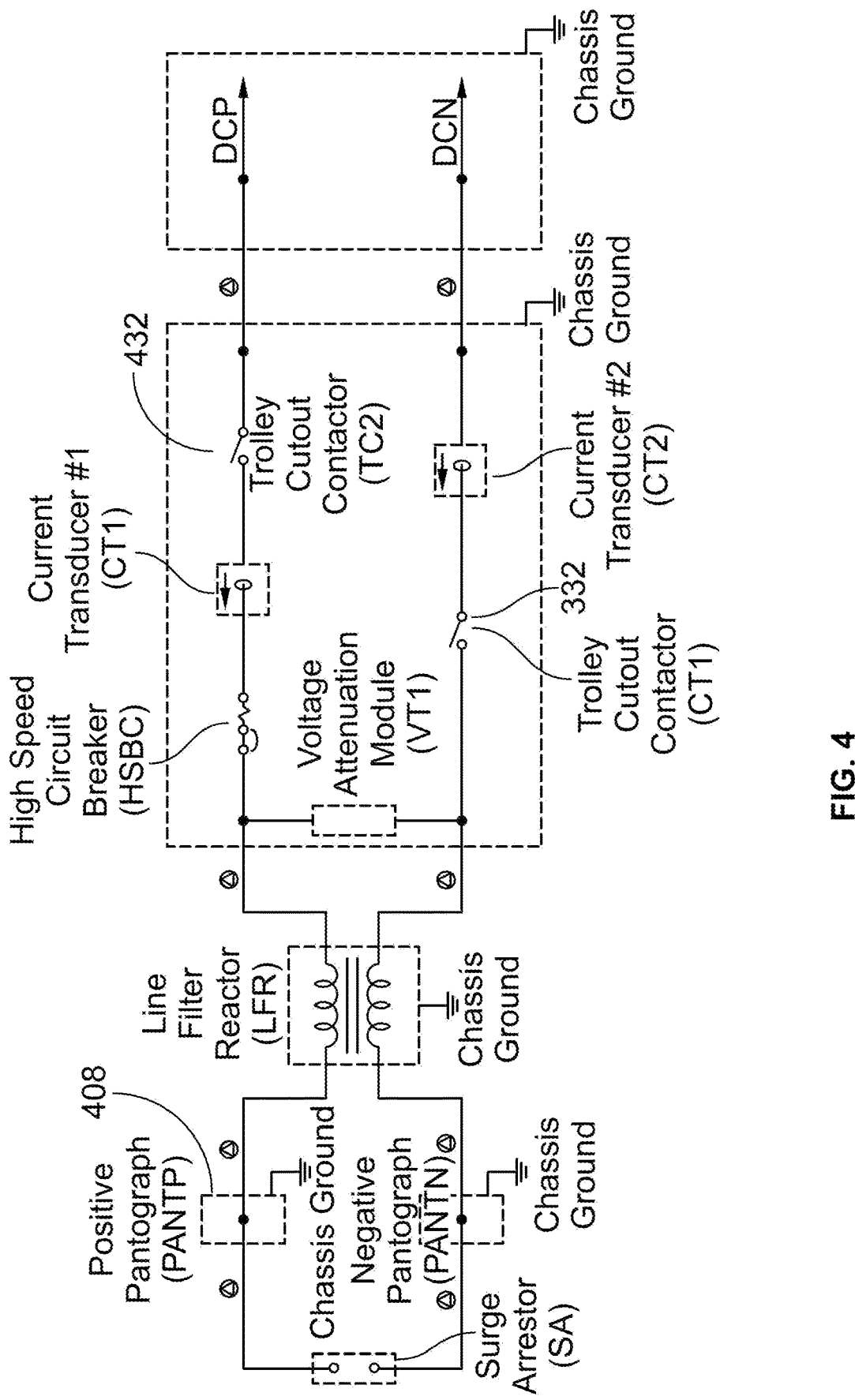
FIG. 4 is a schematic overview of a vehicle, according to one example.

FIG. 4 illustrates a schematic overview of the vehicle. The vehicle may include a pantograph 408, a chassis, and one or more contactors 432. The sensors, discussed above, may measure electrical characteristics of the electric current conducted to the vehicle from the conductive pathway and through the collector device. The controller may receive a measurement from the sensors, for example a current between the collector device and the conductive pathway. The controller may confirm whether the measured current is within an acceptable range for operating the vehicle in a trolley mode. As used herein, a trolley mode may be where the collector device of the vehicle engages the conductive pathway such that the conductive pathway provides at least some electric energy to power loads of the vehicle. In one example, there may be an incoming current range from the conductive pathway. If a measured current from the conductive pathway is outside of the incoming current range, operation of the vehicle in the trolley mode may be inhibited. The incoming current range may vary based on a voltage of the electrification system. Additionally, the vehicle may include a sensor to identify ground faults.

Figure 5:
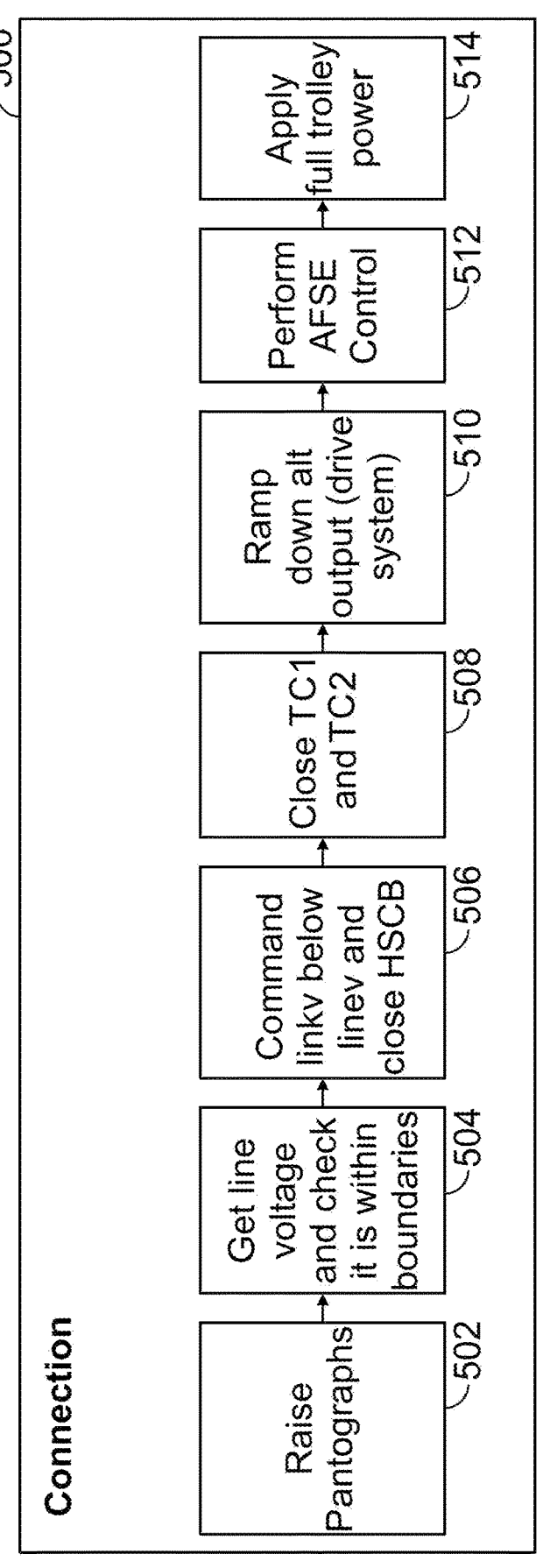
FIG. 5 is a method of connecting of a collector device of a vehicle with a conductive pathway, according to one example.

FIG. 5 shows one example of a method 500 of connecting of the collector device of the vehicle with the conductive pathway. The vehicle may be travelling along a portion of the route without any conductive pathway. In this example, the vehicle may rely on the onboard power supply, discussed above, to power the loads of the vehicle. Where the vehicle approaches an upcoming portion of the route that includes the conductive pathway, the controller may prepare the vehicle for connection with the conductive pathway.

As shown at step 502, the controller may direct the collector device, for example the pantograph, to move to the raised position. This may allow the collector assembly to be in position to engage the conductive pathway, such as the overhead catenary. In another example, the collector device may be the conductive shoe and the conductive pathway may be the electrified rail. The conductive shoe may be lowered to engage the electrified rail.

At step 504, the method may include a sensor measuring the voltage of the conductive pathway. The controller may receive the measured output from the sensor and determine whether measured voltage may be within a predetermined threshold. In one example, the predetermined threshold may be between 1100V and 2000V. If the voltage of the conductive pathway is outside of the predetermined threshold, the controller may prevent the connection of the collector device to the conductive pathway. If the voltage of the conductive pathway is within the predetermined threshold, the controller may direct a high-speed circuit breaker (HSCB) to close and increase a link voltage of the collector assembly to be near the voltage of the conductive pathway, as shown at step 506. In one example, the link voltage may be within about 20-40V of the voltage of the conductive pathway.

At step 508, one or more contactors TC1, TC2, may be closed. A sensor may provide feedback to the controller to confirm that the contactors are closed. The feedback may include monitoring a current conducted by the collector device subsequent to the contactors being closed. At step 510, the onboard power source may ramp down output. This may reduce the engine speed to an engine trolley speed, which may be a target speed for the engine when the collector device is coupled with the conductive pathway and operating in the trolley mode. This may allow the vehicle to receive the current from the collector device to power the vehicle.

At step 512, a current of the collector device may be measured and a control system may be run. The control system may compare the current of the collector device to an output from the onboard power source. If the current through the collector device is insufficient, the controller may prevent connection of the collector device with the conductive pathway. If the current through the collector device is sufficient, the method may proceed. Specifically, if the current of the collector device is less than 0, the output from the onboard power source may be reduced. In one example, the output from the onboard power source may be reduced by 100V. If the current of the collector device then increases to above 0, the method may proceed to the next step. However, if the current of the collector device does not increase to above 0, connection to the conductive pathway may be prevented. If the current of the collector device is greater than 0, the output from the onboard power source may be reduced by a designated rate (e.g., 100V/s or a faster or slower rate) until a direct current of the vehicle may be less than a determined direct current. In one example, the determined direct current may be 100 A. The onboard power source may be set to an idle voltage and an engine speed may be directed to the engine trolley speed. Once the direct current is equal to 0, the method may proceed to the next step.

At step 514, the vehicle may move to a full trolley power. In the full trolley power, the collector device may be coupled with the conductive pathway and the vehicle may operate in the trolley mode. The conductive pathway may be providing the primary source of power to power the loads of the vehicle in the trolley mode.

Typically, a vehicle may operate in the trolley mode for a portion of a trip. The vehicle may operate in the trolley mode for the entirety of the trip, however, a vehicle often may be in the trolley mode for between 30 seconds and 10 minutes. As such, the vehicle, and the components thereof, may need to be able to effectively disconnect from the conductive pathway and exit the trolley mode. For a normal disconnection of the collector device of the vehicle from the conductive pathway, a closed loop control system may be used. In another example, an open loop control system may be used. Various parameters may be measured by sensors and communicated to the controller. The controller may use the parameters to determine the state of the disconnection of the vehicle from the conductive pathway. In one example, one parameter may be the current of the collector device. The current may be read by current sensors within the vehicle, such as an ammeter. The vehicle may include a rectifier that converts alternating current (AC) to direct current (DC). The DC may be used to power the loads of the vehicle. The current of the rectifier output may be read. The current of the rectifier output may be the current that may be currently available to the vehicle.

Figure 6:
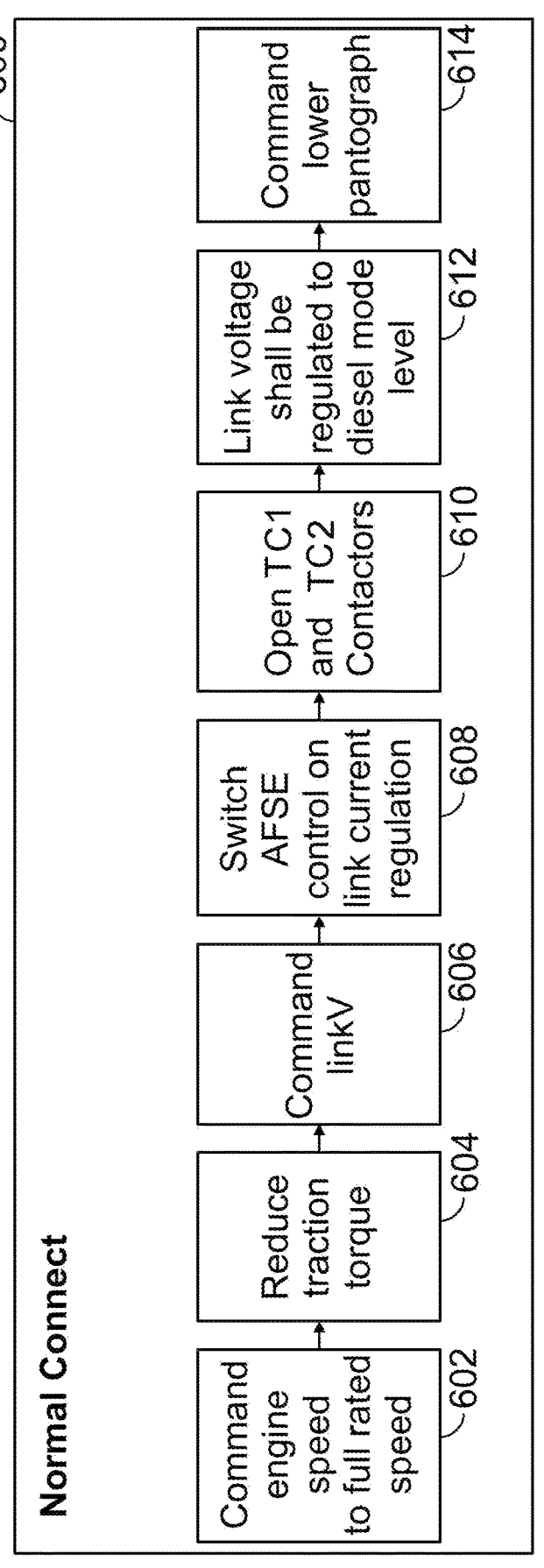
FIG. 6 is a method of a normal disconnection of a collector device of a vehicle with a conductive pathway, according to one example.

FIG. 6 shows one example of a method of a normal disconnection of the collector device of the vehicle with the conductive pathway. The normal disconnection may occur when an operator or controller of the vehicle is aware of an upcoming disconnection, such as a planned disconnection. One aim of the normal disconnection may be a safe, smooth transition that does not damage the components of the vehicle or the conductive pathway. At step 602, the method may include adjusting an onboard power source while decreasing the off-board power source. For example, the engine speed may be increased to increase the power generated onboard the vehicle, more energy may be obtained from batteries onboard the vehicle, or the like, while less power may be obtained from the off-board source. By increasing the engine speed to the full rated speed, the engine may be able to supplant or compensate for the decrease in power from the conductive pathway as a result of the disconnection. Said another way, when the vehicle disconnects from the conductive pathway, a first electric energy supplied by the conductive pathway to the vehicle may be lost. The first electric energy may be supplanted or replaced by a second electric energy provided by the engine or another onboard power source. The amount the engine speed may be increased proportionally to the amount of energy that was received from the conductive pathway.

At step 604, the method may include reducing a traction torque of a motor. In one example, the reduction of the traction torque may occur 20 milliseconds (MS) after the motor speed may be increased.

At step 606, the method may include adjusting a link voltage to match a current output of a rectifier of the vehicle. At step 608, when the engine reaches a full rated speed, the vehicle may switch the rectifier to a regulation current. When the rectifier switches to the regulation current, a current of the collector device may decrease and the link voltage may increase. The method may then determine when the current of the collector device may be within a predetermined threshold to open contactors TC1, TC2 of the vehicle. In one example, the predetermined threshold to open the contactors may be when the current of the collector device is between 30 A and 250 A. Where the current of the collector device may be outside the predetermined threshold, the vehicle may perform an abnormal or an emergency disconnection, as discussed further below.

At step 610, the method may include opening the contactors of the vehicle. A sensor may provide feedback to the controller confirming that the contactors are open. At step 612, when the current of the collector device may be below a predetermined threshold, the link voltage may be adjusted to an engine only mode level. In one example, the current of the collector device may be below the predetermined threshold when the current of the collector device is 30 A or below. The engine only mode level may be the link voltage used when the engine may be the primary power source of the vehicle. At step 614, the method may include lowering the collector device and completing the disconnection from the conductive pathway.

Figure 7:
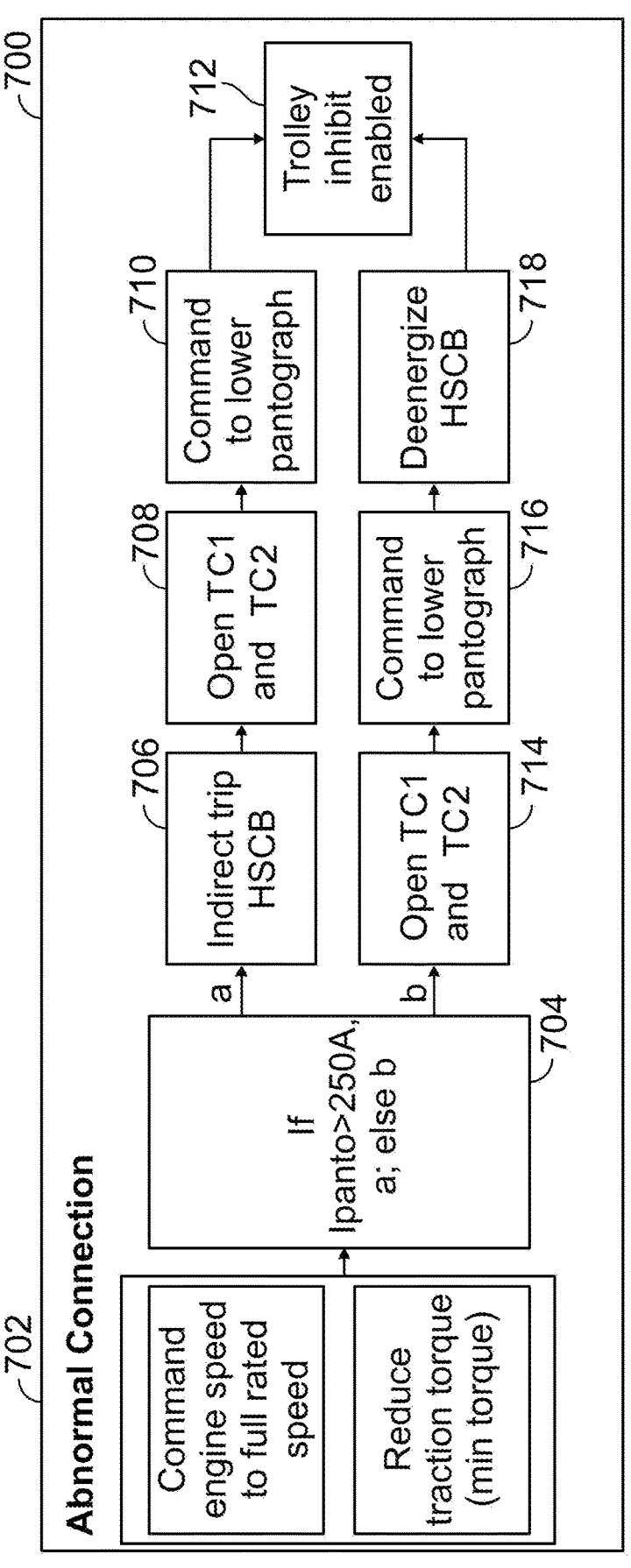
FIG. 7 is a method of an abnormal disconnection of a collector device of a vehicle with a conductive pathway, according to one example.

FIG. 7 shows one example of a method of an abnormal disconnection of the collector device of the vehicle with the conductive pathway. The abnormal disconnection may occur when a disconnection occurs abruptly or unexpectedly and the operator or the controller of the vehicle may have limited time to react to the disconnection. At step 702, the first step may be to command an engine speed to a full rated speed, as well as reducing a traction torque of a motor. In one example, the engine may reach 1000 HP in 300 ms. The traction torque of the motor may be reduced to a minimum value. Reducing the traction torque of the motor toward zero or no traction power may reduce a load interruption by a circuit interruption device.

At step 704, a current of the collector device may be measured. The current may be measured by a sensor, such as an ammeter. The current of the collector device may be measured after a fixed or determined amount of time after step 702. In one example, the fixed amount of time may be 200 ms, however, in other examples, a suitable amount of time may be in a range of from about 50 ms to about 5 seconds. The current may be measured to determine whether a first electric energy exceeds a designated threshold.

If the current of the collector device is above the designated threshold, for example 250 A, the method may proceed to step 706. At step 706, the method may include opening a circuit interruption device. In one example, opening the circuit interruption device may include indirectly tripping a high-speed circuit breaker (HSCB) of the vehicle. Where the current running through the collector device may be high, for example above 250 A, and the vehicle may disconnect from the conductive pathway, this large current could cause an arc that may damage the components of the collector device and/or the vehicle. However, the HSCB may be designed to handle such an arc and direct the current with the indirect trip. Thus, the HSCB may be damaged by the arc, but the HSCB may be replaced without having to replace the entirety of the collector device. The HSCB may be tripped by adding a device that may be mechanically separate from the HSCB. When tripped, the device may pull an arm of the HSBC which may release fingers and activate a spring. This may force the HSCB to open. In one example, the HSCB may have an internal protection which may allow the HSCB to open if the current is above an upper limit. In one example, the upper limit may be about 2500 A, however, in other examples, the upper limit may be less than or greater than 2500 A and selected with reference to the end use application. Equipment for different Amperages may not be interchangeable, and materials and sensor may not be substitutable. For example, an insulative material suitable for low amperage or voltage work may not perform properly above a level determined by factors such as the material's properties, the material's thickness, peak demands of the system, environmental factors, and the like.

At step 708, the method may include opening one or more contactors TC1, TC2 of the collector assembly. Once the vehicle has received feedback confirming that the contactors are open, the method may include moving the collector device, as shown at step 710. In one example, moving the collector device may include lowering a pantograph from the conductive pathway. In another example, moving the collector device may include moving a conductive shoe away from the conductive pathway. The conductive pathway may extend along a route travelled by the vehicle.

At step 712, the method may include enabling a trolley inhibit mode. The trolley inhibit mode may prevent the collector device of the vehicle from engaging the conductive pathway and operating in the trolley mode. The trolley inhibit mode may remain until a review of the vehicle, pathway, route, and/or components has been conducted and performance has been approved.

If the current of the collector device may be below the designated threshold, for example 250 A, the method may proceed to step 714. At step 714, the method may include opening the contactors of the collector assembly. The contactors may be able to handle and dissipate a current below 250 A. Thus, the contactors may be opened to facilitate the disconnection where the current may be below the designated threshold. Once the vehicle receives confirmation that the contactors are open, the method may include lowering the collector device, as shown at step 716. The collector device may be lowered to prepare for disconnection from the conductive pathway. At step 718, the method may include deenergizing the circuit interruption device. In one example, the circuit interruption device may be the HSCB. In this example, the contactors were able to dissipate the current, and thus the HSCB may be deenergized rather than being tripped, as in step 706. Lastly, at step 712, the method may include enabling the trolley inhibit mode, as discussed above.

Figure 8:
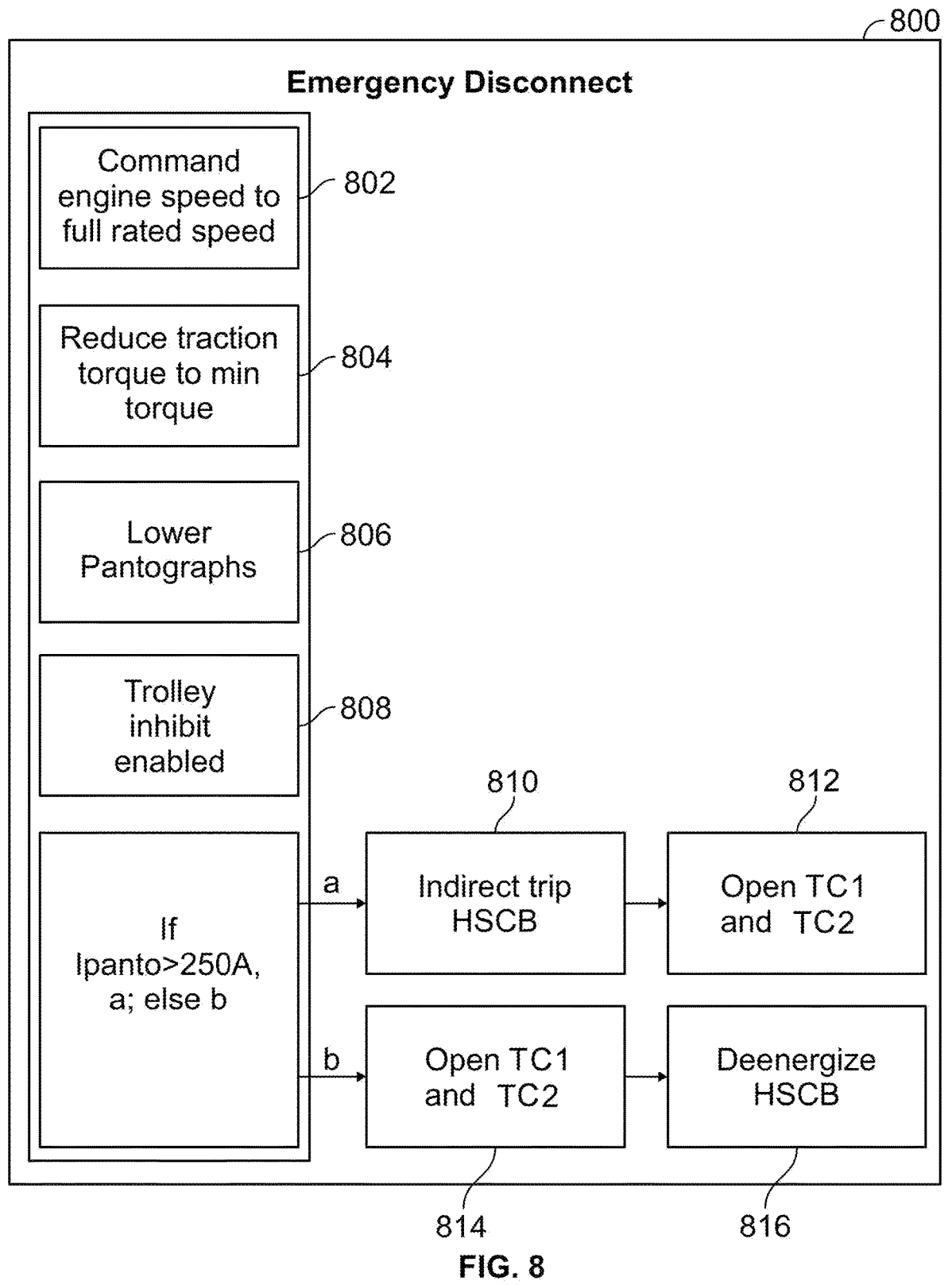
FIG. 8 is a method of an emergency disconnection of a collector device of a vehicle with a conductive pathway, according to one example.

FIG. 8 shows one example of a method of an emergency disconnection of the collector device of the vehicle with the conductive pathway. The emergency disconnection may occur when a disconnection abruptly or unexpectedly occurs and there may be a severe lack of time to respond. The method of abnormal disconnection and emergency disconnection may share some similarities; however, the steps of the emergency disconnection may occur in parallel as a result of the decreased amount of time to disconnect compared with the abnormal disconnection. It will be understood that, while each step will be discussed separately and be number sequentially, all steps may occur simultaneously.

At step 802, the method may include increasing the onboard power (e.g., increasing the amount of power obtained from onboard the vehicle, such as by increasing the engine speed, obtaining more energy from batteries, etc. Increasing the engine speed to a full rated speed may prepare the vehicle for the upcoming decrease of electrical energy from the conductive pathway as a result of the disconnection. At step, 804 the method may include reducing a traction torque of a motor. The traction torque of the motor may be reduced to a minimum value.

At step 806, the method may include moving the collector device. In one example, moving the collector device may include lowering a pantograph from the conductive pathway. In another example, moving the collector device may include moving a conductive shoe away from the conductive pathway. The conductive pathway may extend along a route travelled by the vehicle. The moving of the collector device may occur concurrently with the reduction of the traction torque of the motor. At step 808, the method may include enabling a trolley inhibit mode. The trolley inhibit mode is similar to that described in relation to the abnormal disconnection.

If the current of the collector device is above a predetermined threshold, for example 250 A, the method proceeds to step 810. At step 810, the method may include opening a circuit interruption device. In one example, opening the circuit interruption device may include indirectly tripping the HSCB of the vehicle. Where the current running through the collector device is high, for example above 250 A, and the vehicle may disconnect from the conductive pathway, this large current may cause an arc that is damaging to the components of the collector device and vehicle. However, the HSCB may be designed to handle such an arc and direct the current with the indirect trip. Thus, the HSCB may be damaged by the arc, but the HSCB may be replaced without having to replace the entirety of the collector device. At step 812, the method may include opening the contactors of the collector device. The vehicle may receive feedback to confirm that the contactors are open.

If the current of the collector device is below the predetermined threshold, for example 250 A, the method proceeds to step 814. At step 814, the method may include opening the contactors of the collector assembly. The contactors may be able to handle and dissipate a current below the predetermined threshold. Thus, the contactors may be open to facilitate the disconnection below the predetermined threshold. The vehicle may receive feedback confirming that the contactors are open. At step 816, the method may include deenergizing the HSCB. In this example, the contactors were able to dissipate the current, and thus the HSCB may be deenergized rather than tripped, as in step 810.

In one example, the emergency disconnection methods may be caused by a communication loss on the vehicle. The vehicle may have multiple communication systems that allow components of the vehicle to communicate, as well as allowing the vehicle to communicate with control centers or other off-board equipment or persons. The control centers may be onboard or off-board the vehicle. In one example, the communication system includes a controller, a microcontroller, a processor, or a microprocessor. In one example, the communication system includes a drive system controller (DSC) and a Danfoss system. The DSC and the Danfoss may have emergency disconnection methods incorporated to allow exit from the conductive pathway in the event of a communication loss. The emergency exits of both the DSC and the Danfoss may follow the same instructions to allow the same steps to be executed simultaneously.

While the following discusses a communication loss between the DSC and the Danfoss, these two communication devices are merely exemplary. The below actions may apply to any two communication devices. A communication loss may be classified as any of the following: the Danfoss being unable to receive and/or DSC being unable to send messages; DSC being unable to receive and/or the Danfoss being unable to send messages; or the Danfoss and DSC both being unable to receive and/or send messages to each other. If the Danfoss is not receiving updated messages, the Danfoss may continue sending the DSC messages on the Danfoss's actions. The Danfoss may then take communication loss actions, described below. Finally, the DSC may take the communication loss actions. If the DSC is not receiving updated messages, the DSC may continue sending the Danfoss messages on the DSC' s actions. The DSC may then take communication loss actions. Finally, the Danfoss may take the communication loss actions. If both the Danfoss and the DSC are not receiving updated messages, both the DSC and the Danfoss may take the communication loss actions.

In the event of a communications loss, there may be certain actions that the Danfoss may take to ensure disconnection from the conductive pathway is successful. If the HSCB is closed, the system will measure the current of the collector device. If the current of the collector device is greater than a predetermined value, for example 250 A, the Danfoss may indirect trip the HSCB. The HSCB may be tripped by adding a device that is mechanically separate from the HSCB. When tripped, the device may pull an arm of the HSCB which may release fingers and activate a spring. This may force the HSCB to open. The Danfoss may wait to receive feedback confirming the HSCB is deenergized before proceeding. When the Danfoss receives feedback confirming the HSCB is deenergized, the Danfoss may open a first contactor switch and a second contactor switch. The collector device may then be lowered.

Where the HSCB is closed, but the current of the collector device is less than the predetermined value, the Danfoss may open the contactors. The Danfoss may receive feedback to confirm that the contactors are open. Then the Danfoss may deenergize the HSCB and lower the collector device.

In the event the HSCB is not closed, the Danfoss may open the contactors and then lower the pantographs or raise the conductive shoe.

In the event of a communication loss, there may be certain actions the DSC may take to ensure the disconnection from the conductive pathway is successful. The DSC may command engine speed to a first fuel operation as soon as possible. In one example, the first fuel may be a diesel fuel. The DSC may command voltage from the conductive pathway to propel the voltage level below a connected voltage. The connected voltage may be the voltage when the collector device is engaging the conductive pathway. The DSC may ramp torque to the level where the vehicle is in a predetermined range, for example between 500-700 A. Once the current reaches around 0 A, the DSC may ramp torque back up. At this point, the Danfoss may attempt to lower the collector device if the collector device was raised. If the collector device was raised when the communication loss occurred, latches may not be applied when the collector device is lowered due to the latches not receiving the down inputs. If the collector device was down when the communication loss occurred, the latches may remain closed.

Figure 9:
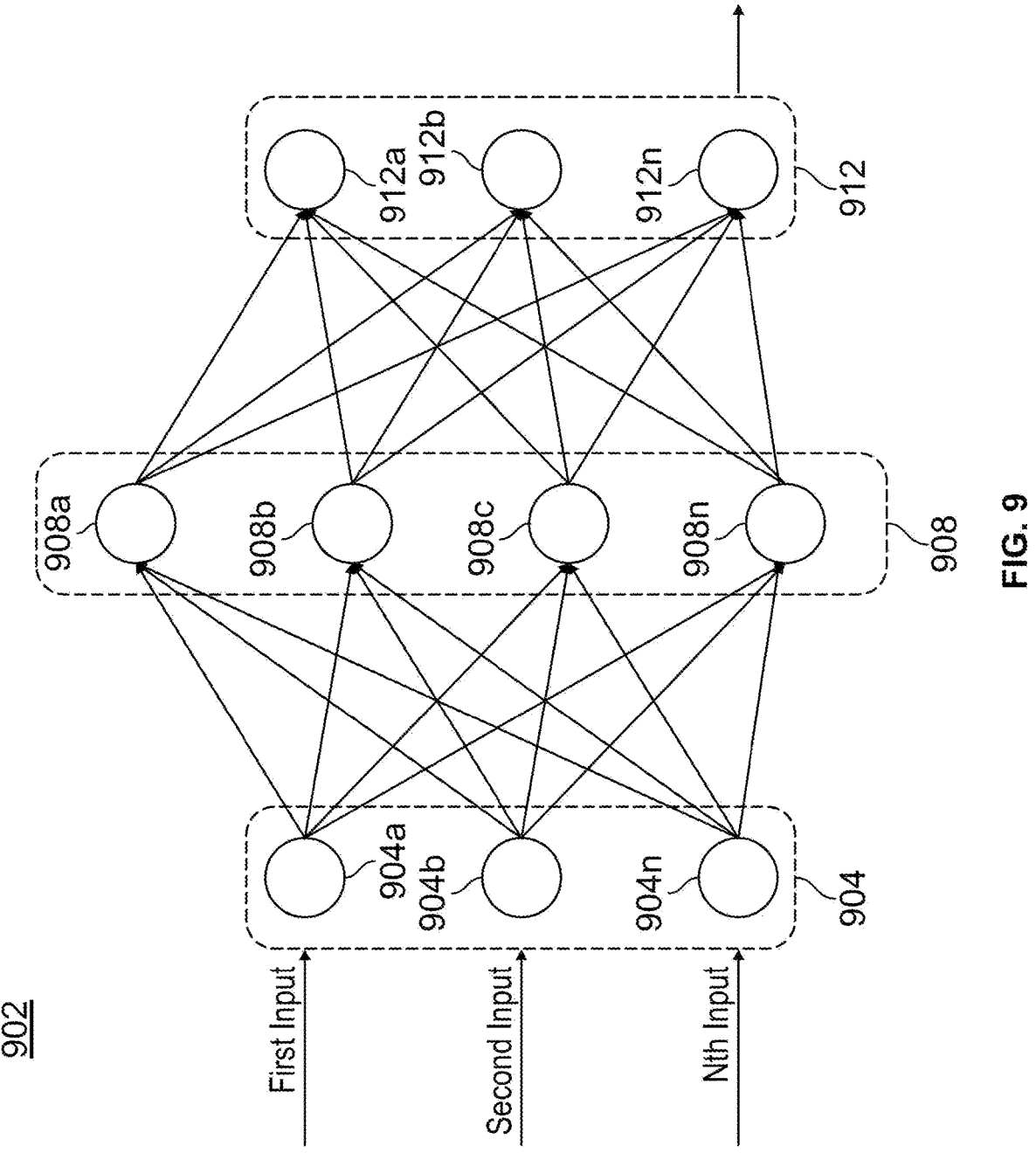
FIG. 9 is a functional block diagram of an example neural network that can be used by a vehicle control system, according to one example.

As previously described, one or more of the control systems described herein may be implemented in an AI or machine-learning system. FIG. 9 illustrates a functional block diagram of an example neural network 902 that can be used by a control system. The control system may review various inputs, described above, for example the first electric energy supplied by the off-board source of power, the second electric energy supplied by the onboard source of power, the alignment of the vehicle and the conductive pathway, the position of the collector device, or the like. In an example, the neural network 902 can represent a long short-term memory (LSTM) neural network. In an example, the neural network 902 can represent one or more recurrent neural networks (RNN). The neural network 902 may be used to implement the machine learning as described herein, and various implementations may use other types of machine learning networks. The neural network 902 may include an input layer 904, one or more intermediate or hidden layers 908, and an output layer 912. Each layer 904, 908, 912 includes artificial individual units, or neurons. Each neuron can receive information (e.g., as input into the neural network 902 or as received as output from another neuron in another layer or the same layer), process this information to generate output, and provide the output to another neuron or as output of the neural network 902. The input layer 904 may include several input neurons 904a, 904b . . . 904n. The hidden layer 908 may include several intermediate neurons 908a, 908b . . . 908n. The output layer 912 may include several output neurons outputs 912a, 912b . . . 912n. The inputs may include, for example, the first electric energy, the second electric energy, the alignment of the vehicle and the conductive pathway, the position of the collector device, or the like.

Each neuron can receive an input from another neuron and output a value to the corresponding output to another neuron (e.g., in the output layer 912 or another layer). For example, the intermediate neuron 908a can receive an input from the input neuron 904a and output a value to the output neuron 912a. Each neuron may receive an output of a previous neuron as an input. For example, the intermediate neuron 908b may receive input from the input neuron 904b and the output neuron 912a. The outputs of the neurons may be fed forward to another neuron in the same or different intermediate layer 908.

The processing performed by the neurons may vary based on the neuron but can include the application of the various rules or criteria described herein to partially or entirely decide one or more aspects of the control system, for example when to prepare for a disconnection, an abnormal disconnection, an emergency disconnection, or the like. The output of the application of the rule or criteria can be passed to another neuron as input to that neuron. One or more neurons in the intermediate and/or output layers 908, 912 can determine links between one or more aspects of the vehicle control system, for example when an abnormal disconnection is upcoming. As used herein, a "link" may refer to a preferred operation of the vehicle control system based on the inputs, for example an operation of the vehicle given an abnormal disconnection. The preferred operation may be based on increasing performance, efficiency, safety, longevity, or a combination of any or all of these factors. The last output neuron 912n in the output layer 912 may output a link or no-link decision. For example, the output from the neural network 902 may be that a disconnection may be approaching given the position of the vehicle and the conductive pathway. Although the input layer 904, the intermediate layer(s) 908, and the output layer 912 may be depicted as each including three artificial neurons, one or more of these layers may contain more or fewer artificial neurons. The neurons can include or apply one or more adjustable parameters, weights, rules, criteria, or the like, as described herein, to perform the processing by that neuron.

In various implementations, the layers of the neural network 902 may include the same number of artificial neurons as each of the other layers of the neural network 902. For example, the first electric energy, the second electric energy, the alignment of the vehicle and the conductive pathway, the position of the collector device, or the like may be processed to provide information to the input neurons 904a-904n. The output of the neural network 902 may represent a link or no-link of the inputs to the a given output. More specifically, the inputs can include historical data. The historical data can be provided to the neurons 908a-908n for analysis and links between the historical data. The neurons 908a-908n, upon finding links, may provide the potential links as outputs to the output layer 912, which can determine a link, no link, or a probability of a link.

In some embodiments, the neural network 902 may be a convolutional neural network. The convolutional neural network can include an input layer, one or more hidden or intermediate layers, and an output layer. In a convolutional neural network, however, the output layer may include one fewer output neuron than the number of neurons in the intermediate layer(s), and each neuron may be connected to each output neuron. Additionally, each input neuron in the input layer may be connected to each neuron in the hidden or intermediate layer(s).

Such a neural network-based vehicle control system can be trained by operators, automatically self-trained by the vehicle control system itself, or can be trained both by operators and by the vehicle control system itself to improve how the system operates.

With regard to the fuel, the fuel may be a single fuel type in one embodiment and in other embodiments the fuel may be a mixture of a plurality of different fuels. In one example of a fuel mixture, a first fuel may be liquid and a second fuel may be gaseous. A suitable liquid fuel may be diesel (regular, biodiesel, HDRD, and the like), gasoline, kerosene, dimethyl ether (DME), alcohol, and the like. A suitable gaseous fuel may be natural gas (methane) or a short chain hydrocarbon, hydrogen, ammonia, and the like. In one embodiment, fuel may be inclusive of stored energy as used herein. In that perspective, a battery state of charge, or a source of compressed gas, a flywheel, fuel cell, and other types of non-traditional fuel sources may be included.

In one embodiment, the controller or control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller or control system may include a policy engine that may apply one or more policies. These policies may be based at least in part on characteristics of a given item of equipment or environment. With respect to control policies, a neural network can receive input of a number of environmental and task-related parameters. These parameters may include an identification of a first electric energy from the off-board source of power, the second electric energy from the onboard source of power, data from various sensors, and location and/or position data. The neural network can be trained to generate an output based on these inputs, with the output representing an action or sequence of actions that the vehicle should take to accomplish the desired connection or disconnection. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller can use this artificial intelligence or machine learning to receive input (e.g., a location or change in location), use a model that associates locations with different operating modes to select an operating mode of the one or more functional devices of the vehicle, and then provide an output (e.g., the operating mode selected using the model). The controller may receive additional input of the change in operating mode that was selected, such as analysis of noise or interference in communication signals (or a lack thereof), operator input, or the like, that indicates whether the machine-selected operating mode provided a desirable outcome or not. Based on this additional input, the controller can change the model, such as by changing which operating mode would be selected when a similar or identical first electrical energy and second electrical energy are received the next time or iteration. The controller can then use the changed or updated model again to select an operating mode, receive feedback on the selected operating mode, change or update the model again, etc., in additional iterations to repeatedly improve or change the model using artificial intelligence or machine learning.

In one embodiment, a method is described that may include detecting that a vehicle that is propelled by an electric drive system having one or more motors disconnects or begins disconnecting from an off-board source of power while the motors are being powered by the off-board source of power. The method may include supplanting a decreasing amount of a first electric energy supplied by the off-board source of power to the electric drive system with an amount of a second electric energy supplied by an onboard source of power to the electric drive system responsive to detecting that the vehicle disconnects from the off-board source of power.

In one example, detecting that the vehicle disconnects or begins disconnecting from the off-board source of power may include detecting a decrease in current received by the vehicle from the off-board source of power. Detecting the decrease in the current may presage a subsequent decrease in a voltage from the off-board source of power. The method may include responding to the detecting the decrease in the current by supplanting the subsequent decrease in the voltage from the of-board source of power with an amount of a second voltage supplied by the onboard source of power prior to or while the subsequent decrease in the voltage from the off-board source of power occurs.

The method may include controlling an acceleration or a deceleration of the vehicle to within a designated threshold range based at least in part on a combined amount of the first electric energy supplied by the off-board source of power and the second electric energy supplied by the onboard source of power. The amount of the second electric energy supplied by the onboard source may be less than a power capability at which the off-board source of power may be able to provide the first electric energy. The onboard source of power may include an engine. The method may include increasing an engine speed of the engine to a designated speed and reducing a torque output by the one or more motors, or both of the foregoing, responsive to the detection of the disconnect from the off-board source of power.

In one example, supplanting the decreasing amount of the first electric energy supplied by the off-board source of power to the electric drive system with the amount of the second electric energy supplied by the onboard source of power to the electric drive system responsive to detecting that the vehicle disconnects or begins disconnecting from the off-board source of power may include one or more of: opening one or more switches between the one or more motors and at least one of a pantograph of the vehicle or a conductive shoe of the vehicle; monitoring an electric current conducted from the at least one of the pantograph or the conductive shoe subsequent to opening the one or more switches; or controlling (c) an extended height of the pantograph relative to an adjacent catenary or (d) a distance between the conductive shoe and an electrified conductive body, wherein one or both of the adjacent catenary and the electrified conductive body extend along a route being traveled by the vehicle.

The method may include determining whether an abnormal disconnection or an emergency disconnection of the vehicle from the off-board source of power may have occurred or may be occurring. Responsive to determining the abnormal disconnection may have occurred or may be occurring, the method may include reducing a load interruption caused by a circuit interruption device by reducing a traction power generated by the one or more motors toward zero or no traction power and determining whether the first electric energy conducted to the vehicle from the off-board source of power exceeds a designated threshold value. Responsive to determining that the first electric energy conducted to the vehicle from the off-board source of power may exceed the designated threshold, the method may include opening the circuit interruption device, opening one or more switches disposed along conductive paths between one or more of a pantograph or a conductive shoe of the vehicle and the one or more motors of the vehicle responsive to the detection, or one or more of lowering the pantograph from a catenary or moving the conductive shoe away from an electrified conductive body extending along a route traveled by the vehicle subsequent to the detection.

In one example, responsive to determining that the emergency disconnection of the vehicle from the off-board source of power has occurred or is occurring, the method may include at least one of: increasing an engine speed of an engine to a designated speed, reducing a torque output by the one or more motors concurrent with increasing the engine speed, one or more of lowering a pantograph of the vehicle from a catenary or concurrently moving a conductive shoe of the vehicle from an electrified conductive body extending along a route being traveled by the vehicle concurrent with reducing the motor torque, or completely disconnecting the vehicle from the off-board power source in response to a determination that an electric current conducted to the vehicle from the off-board source of power exceeds a designated threshold.

The vehicle may be determined to disconnect from the off-board source of power responsive to one or more of a pantograph of the vehicle separating from a catenary or a conductive shoe of the vehicle separating from an electrified conductive body extending along a route traveled by the vehicle. The method may include detecting that the vehicle disconnects or begins disconnecting from the off-board source of power includes evaluating output from one or more sensors that monitor a connection of the vehicle with the off-board source of power. The output from the one or more sensors that is evaluated may include one or more of optical information from an optical sensor, an electrical characteristic from one or more of a voltage sensor or a current sensor, a strain output from a strain gauge, detection of a pantograph of the vehicle raising to a threshold height above the vehicle, or detection of a conductive shoe of the vehicle lowering to a threshold depth below the vehicle.

In one embodiment, a system is described that may include one or more processors that may be coupled with a vehicle that is propelled by an electric drive system having one or more motors. The vehicle may be powered by one or more of a first electric energy from an off-board power source or a second electric energy from an onboard power source. The one or more processors may detect whether the vehicle disconnects or begins disconnecting from the off-board power source while the vehicle is being powered by the first electric energy of the off-board power source. The one or more processors may supplant the first electric energy of the off-board power source to the vehicle with an amount of the second electric energy of the onboard power source responsive to detecting the vehicle disconnects or begins disconnecting from the off-board power source.

In one example, the onboard power source may include one or more of a fuel cell, one or more battery cells, or a capacitor bank. The one or more processors may detect whether the vehicle may disconnect or begin disconnecting from the off-board power source at least in part by detecting a decrease in current received by the vehicle from the off-board power source presaging a subsequent decrease in voltage of the first electric energy received by the vehicle from the off-board power source. The onboard power source may include an engine. In one example, the one or more processors may increase an engine speed of the engine to a designated speed responsive to the detection of the disconnect from the off-board power source.

In one embodiment, a system is described that may include a collector device coupled to a vehicle that is propelled by an electric drive system having one or more motors. A conductive pathway may extend along a route being travelled by the vehicle. The conductive pathway may selectively engage the collector device to provide a first electric energy to the electric drive system. A controller may detect a disconnection of the vehicle from the conductive pathway while the electric drive system is being powered by the first electric energy. The controller may supplant a decreasing amount of the first electric energy from the collector device with an amount of a second electric energy supplied by an onboard power source to power the electric drive system responsive to the detection of the disconnection from the conductive pathway.

In one example, the onboard power source may include one or more of a fuel cell, one or more battery cells, or a capacitor bank. The controller may detect a disconnection of the vehicle from the conductive pathway at least in part by detecting a decrease in current received by the vehicle from the conductive pathway presaging a subsequent decrease in voltage received by the vehicle from the conductive pathway.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other.

In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method, comprising:
   detecting that a vehicle that is configured to be propelled by an electric drive system having one or more motors disconnects or begins disconnecting from an off-board source of power while the one or more motors are being powered by the off-board source of power; and
   supplanting a decreasing amount of a first electric energy supplied by the off-board source of power to the electric drive system with an amount of a second electric energy supplied by an onboard source of power to the electric drive system responsive to detecting that the vehicle disconnects or begins disconnecting from the off-board source of power,
   wherein detecting that the vehicle disconnects or begins disconnecting from the off-board source of power includes evaluating output from one or more sensors that monitor a connection of the vehicle with the off-board source of power.

2. The method of claim 1, wherein the detecting that the vehicle disconnects or begins disconnecting from the off-board source of power includes detecting a decrease in current received by the vehicle from the off-board source of power.

3. The method of claim 2, wherein the detecting the decrease in the current presages a subsequent decrease in a voltage from the off-board source of power, and the method further comprises responding to the detecting the decrease in the current by supplanting the subsequent decrease in the voltage from the off-board source of power with an amount of a second voltage supplied by the onboard source of power prior to or while the subsequent decrease in the voltage from the off-board source of power occurs.

4. The method of claim 1, further comprising controlling an acceleration or a deceleration of the vehicle to within a designated threshold range based at least in part on a combined amount of the first electric energy supplied by the off-board source of power and the second electric energy supplied by the onboard source of power.

5. The method of claim 1, wherein the amount of the second electric energy supplied by the onboard source is less than a power capability at which the off-board source of power is configured or able to provide the first electric energy.

6. The method of claim 1, wherein the onboard source of power includes an engine, and further comprising at least one of increasing an engine speed of the engine to a designated speed or reducing a torque output by the one or more motors responsive to detecting that the vehicle disconnects or begins disconnecting from the off-board source of power.

7. The method of claim 6, wherein supplanting the decreasing amount of the first electric energy supplied by the off-board source of power to the electric drive system with the amount of the second electric energy supplied by the onboard source of power to the electric drive system responsive to detecting that the vehicle disconnects or begins disconnecting from the off-board source of power comprises one or more of:

opening one or more switches between the one or more motors and at least one of (a) a pantograph of the vehicle or (b) a conductive shoe of the vehicle;

monitoring an electric current conducted from the at least one of the pantograph or the conductive shoe subsequent to opening the one or more switches; or controlling (c) an extended height of the pantograph relative to an adjacent catenary or (d) a distance between the conductive shoe and an electrified conductive body, wherein one or both of the adjacent catenary and the electrified conductive body extend along a route being traveled by the vehicle.

8. The method of claim 1, further comprising determining whether an abnormal disconnection or an emergency disconnection of the vehicle from the off-board source of power has occurred or is occurring.

9. The method of claim 8, further comprising, responsive to determining the abnormal disconnection has occurred or is occurring:

reducing a load interruption caused by a circuit interruption device by reducing a traction power generated by the one or more motors toward zero or no traction power;

determining whether the first electric energy conducted to the vehicle from the off-board source of power exceeds a designated threshold value; and responsive to determining that the first electric energy conducted to the vehicle from the off-board source of power exceeds the designated threshold, one or more of:

opening the circuit interruption device, opening one or more switches disposed along conductive paths between one or more of a pantograph or a conductive shoe of the vehicle and the one or more motors of the vehicle, or one or more of lowering the pantograph from a catenary or moving the conductive shoe away from an electrified conductive body extending along a route traveled by the vehicle.

10. The method of claim 9, responsive to determining that the emergency disconnection of the vehicle from the off-board source of power has occurred or is occurring, at least one of:

increasing an engine speed of an engine to a designated speed;

reducing a torque output by the one or more motors concurrent with increasing the engine speed;

one or more of lowering a pantograph of the vehicle from a catenary or moving a conductive shoe of the vehicle from an electrified conductive body extending along a route being traveled by the vehicle concurrent with reducing the torque output by the one or more motors; or completely disconnecting the vehicle from the off-board power source in response to a determination that the first electric energy supplied by the off-board source of power exceeds a designated threshold.

11. The method of claim 1, wherein detecting that the vehicle disconnects or begins disconnecting from the off-board source of power includes detecting one or more of a pantograph of the vehicle separating from a catenary or a conductive shoe of the vehicle separating from an electrified conductive body extending along a route traveled by the vehicle.

12. The method of claim 1, wherein the output from the one or more sensors that is evaluated includes one or more of optical information from an optical sensor, an electrical characteristic from one or more of a voltage sensor or a current sensor, a strain output from a strain gauge, detection of a pantograph of the vehicle raising to a threshold height above the vehicle, or detection of a conductive shoe of the vehicle lowering to a threshold depth below the vehicle.

13. A system, comprising:

one or more processors configured to:

be coupled with a vehicle that is propelled by an electric drive system having one or more motors, the vehicle powered by one or more of a first electric energy from an off-board power source or a second electric energy from an onboard power source;

detect whether the vehicle disconnects or begins disconnecting from the off-board power source while the vehicle is being powered by the first electric energy of the off-board power source;

supplant the first electric energy of the off-board power source to the vehicle with an amount of the second electric energy of the onboard power source responsive to detecting the vehicle disconnects or begins disconnecting from the off-board power source, wherein the onboard power source includes an engine, the one or more processors configured to increase an engine speed of the engine to a designated speed responsive to detecting the vehicle disconnects or begins disconnecting from the off-board power source.

14. The system of claim 13, wherein the onboard power source includes one or more of a fuel cell, one or more battery cells, or a capacitor bank.

15. The system of claim 13, wherein the one or more processors are configured to detect whether the vehicle disconnects or begins disconnecting from the off-board power source at least in part by detecting a decrease in current received by the vehicle from the off-board power source.

16. A system, comprising:

a collector device coupled to a vehicle propelled by an electric drive system having one or more motors;

a conductive pathway extending along a route being travelled by the vehicle, the conductive pathway configured to be selectively engageable with the collector device to provide a first electric energy to the electric drive system; and a controller configured to detect a disconnection of the vehicle from the conductive pathway while the electric drive system is being powered by the first electric energy, the controller configured to supplant a decreasing amount of the first electric energy from the collector device with an amount of a second electric energy supplied by an onboard power source to power the electric drive system responsive to the detection of the disconnection from the conductive pathway.

17. The system of claim 16, wherein the onboard power source includes one or more of a fuel cell, one or more battery cells, or a capacitor bank.

18. The system of claim 16, wherein the controller is configured to detect the disconnection of the vehicle from the conductive pathway at least in part by detecting a decrease in current received by the vehicle from the conductive pathway.

\* \* \* \* \*